United States Patent [19]

Berry et al.

[11] Patent Number: 5,235,455
[45] Date of Patent: Aug. 10, 1993

[54] WIDE BANDWIDTH DIFFERENTIAL AMPLIFIER

[75] Inventors: Mark H. Berry, El Cajon; Debra M. Gookin, San Diego, both of Calif.

[73] Assignee: The United States of American as represented by the Secretary of the Navy, Washington, D.C.

[21] Appl. No.: 666,125

[22] Filed: Feb. 21, 1991

[51] Int. Cl.[5] .......................... H04B 9/00; G01B 9/02
[52] U.S. Cl. ..................................... 359/276; 385/14; 342/54; 359/333
[58] Field of Search .................. 359/173, 195, 276; 364/837; 385/2, 14, 15; 250/227.11; 342/54

[56] References Cited

U.S. PATENT DOCUMENTS

| H474 | 6/1988 | Taylor | 350/96.19 |
|---|---|---|---|
| 4,128,759 | 12/1978 | Hunt et al. | 250/199 |
| 4,473,270 | 9/1984 | Shaw | 350/96.15 |
| 4,493,528 | 1/1985 | Shaw et al. | 350/96.15 |
| 4,514,821 | 4/1985 | Tower | 364/862 |
| 4,521,681 | 6/1985 | Iuaba | 250/205 |
| 4,588,255 | 5/1986 | Tur et al. | 350/96.16 |
| 4,671,605 | 6/1987 | Soref | 350/96.15 |
| 4,702,550 | 10/1987 | Sano | 350/96.16 |
| 4,799,797 | 1/1989 | Huggins | 356/345 |
| 4,830,486 | 5/1989 | Goodwin | 356/5 |
| 4,860,279 | 8/1989 | Falk et al. | 370/1 |
| 4,997,249 | 3/1991 | Berry et al. | 350/96.15 |

FOREIGN PATENT DOCUMENTS 168192  1/1986  European Pat. Off. .

OTHER PUBLICATIONS

"Operational Amplifiers", *Linear Products Data Book*, 1988, pp. 2-4, 2-10, 2-11.
Choi, Y. A., & Taylor, H. F. "Gigahertz-Bandwidth Optoelectronic Differential Amplifier", *Microwave and Optical Technology Letters*, vol. 1, No, Apr. 1988, pp. 49-51.
Kasper, B. L., et al., "Balanced Dual-Detector Receiver for Optical Heterodyne Communication at G--Bit/S Rates", *Electronics Letters*, vol. 22, 1986, pp. 413-415.
Ericsson Components AB product brochure for high-speed LiNbO3 external modulators, PGM 1010/3MP, PGM 1010/5MP, PGM 2010/3MP, and PGM 2010/5MP.
GEC Advanced Optical Products brochure for 18GHz Integrated Optical Amplitude Modulators, Y-35-88-08-01, West Hanningfield Road, Great Baddow, Chelmsford, Essex, England CM2 8HN.
Integrated Optical Modulators brochure for 2.5 GHz and 8 GHz integrated Optical Amplitude Modulators, model Y-35-8808-01 (and models Y-35-5370-01 and Y-35-5600-01), Hoechst Celanese Advanced Photonics, 86 Morris Avenue, Summit, NJ 07901.
Betts, G. E., et al., "High-Performance Optical Analog Link Using External Modulator", *IEEE Photo. Technol. Lett.*, vol. 1, 1989, pp. 404-406.
Berry et al, IEEE Photonics Technical Lett., vol. 3, #3, pp. 276-277, Mar. 1991; abst. only supplied.
Electron, Warf. Def. Electron, vol. 10, #10, pp. 3-32, Oct. 1978; abst: only supplied.
Goodwin et al, "Optical Transversal Filter . . . Weights", Mar. 1 1989, Opt Compat., vol. 9.
Berry et al, "2.0 GHz Sampling Rate . . . Filter"; Nov. 1 1989, Asiloniar Conf., IEEE, Maple Press, pp. 294-296, vol. 1.
Berry et al, "Wide-Band RF Signal Proclating . . .", Dec. 1990, NTIS AN AP-A233-388-8-XAB, 24PP.
Taylor, H. F., "Application of Filter Optic . . . Processing", Sep. 18 1990, Proc. SPIE, Soc. Opt. Eng., vol. 1371, pp. 150-160.

*Primary Examiner*—Nelson Moskowitz
*Attorney, Agent, or Firm*—Harvey Fendelman; Thomas Glenn Keough

[57] ABSTRACT

A differential amplifier for gigahertz bandwidth electrical signals using fiber optics and integrated optical devices has a differential gain which is a function of the electrical to optical and optical to electrical conversion factors. The common mode rejection ratio of the differential amplifier at 1 GHz was greater than 30 dB and the common mode rejection ratio depended on the time difference between the differential amplifier inputs. A differential amplifier fabricated in accordance with this inventive concept could be used as an integrated module in radar and communications systems.

11 Claims, 2 Drawing Sheets

WIDE BANDWIDTH DIFFERENTIAL AMPLIFIER

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATION

This invention is related to a co-pending U.S. patent publication Ser. No. 07/486,622 filed Feb. 26, 1990 by Mark H. Berry and Deborah M. Gookin entitled "Variable Weight Fiber Optic Transversal Filter" now U.S. Pat. No. 4,997,249.

BACKGROUND OF THE INVENTION

The operational (differential) amplifier is today the most widely used analog subassembly, see the article entitled "Operational Amplifiers," *Linear Products Data Book*, Norwood, Mass., Analog Devices Inc., pp. 2–4 (1988). Electronic differential amplifiers are usually limited to bandwidths less than 200 MHz. Some optoelectronic differential amplifiers have been developed for GHz signal bandwidths, see, for example, the article by Y. A. Choi et al. entitled "Gigahertz-Bandwidth Optoelectronic Differential Amplifier", *Microwave and Optical Text Letters*, Vol. 1, pp. 49–51 (1988) and the article by B. L. Kasper et al. entitled "Balanced Dual-Detector Receiver for Optical Communication at Gbit/s Rates", *Electronics Letters*, Vol. 22, pp. 413–415 (1986).

These previous optoelectronic approaches were based on a balanced heterodyne receiver design. The electrical-to-optical and optical-to-electrical conversion was used to electrically isolate the two input signals. The actual signal subtraction was done electronically. This type of circuit has two disadvantages. First, it requires that the constituent devices be carefully selected so they have matching characteristics. Second, the inductors, capacitors and resistors in the balance network can limit the frequency response of the differential amplifier.

Thus, a continuing need exists in the state of the art for an optoelectronic differential amplifier performing signal subtraction while still in the optical domain which provides for several advantages over previous wideband differential amplifiers, namely, eliminating the need for a balancing network, increasing the usable bandwidth, developing a variable gain mechanism and improving linear and spurious free dynamic range.

SUMMARY OF THE INVENTION

The present invention is directed to providing a wide bandwidth differential amplifier for a pair of RF signals g(t) and h(t) for wideband operation with less distortion and losses. At least one source emits optical radiation having a coherence length $l_c$ over a first optical waveguide having a first length and a second optical waveguide having a second length, the difference in length between the first length and the second length being greater than the coherence length $l_c$. A first IOC, suitably adapted for operation on the positive going slope of its response curve to provide an output A+, is optically coupled to the first waveguide to receive the emitted optical radiation and is electrically coupled to receive the RF signal g(t). A second IOC, suitably adapted for operation on the negative going slope of its response curve to provide an output B−, is optically coupled to the second waveguide to receive the emitted optical radiation and is electrically coupled to receive the RF signal h(t). A power combiner is optically coupled to receive the output A+ and the output B− to sum them. The summation of the intensity modulated signals is done incoherently with respect to the optical wavelength and coherently with respect to the electrical wavelength. An interconnected photodetector provides an electrical output representative of the instantaneous difference in amplitude of the RF signals g(t) and h(t).

An object of the invention is to provide a differential amplifier configuration employing integrated optical couplers.

Another object is to provide a differential amplifier relying on integrated optical couplers having a wide bandwidth capability.

Another object of this invention is to provide a general purpose differential amplifier for use as an important subassembly in any fiber optic communications or signal processing type of systems.

Another object of this invention is to provide a general purpose differential amplifier that includes general processing for communications systems.

Another object of this invention is to provide a general purpose differential amplifier that includes signal processing for, for example, radar systems or other systems which would be using fiber optics as the link between a receiver and any processor downstream.

Still another object is to provide an optoelectronic wideband differential amplifier having signal subtraction done in the optical regime.

Still another object is to provide an optoelectronic wideband differential amplifier having improved low noise and large dynamic range for improved differential amplifier performance.

Yet another object is to provide for an optoelectronic wideband differential amplifier eliminating the need for careful matching and tuning as in the case of a conventional electronic wideband differential amplifier or balanced circuit configuration.

These and other objects of the invention will become more readily apparent from the ensuing specification and claims when taken in conjunction with the appended drawings.

DESCRIPTION OF THE PREFERRED EMBODIMENT

Among the characteristics of the differential amplifier of this inventive concept are that it has an unusually large dynamic range for a large bandwidth. The dynamic range is limited by the harmonic distortion in the integrated optical devices and by the noise in the laser and the photodetector. The common mode rejection ratio of the system as a differential amplifier is primarily limited by the relative identicalness of the fiber optic components from which the system is built.

Figure 1:
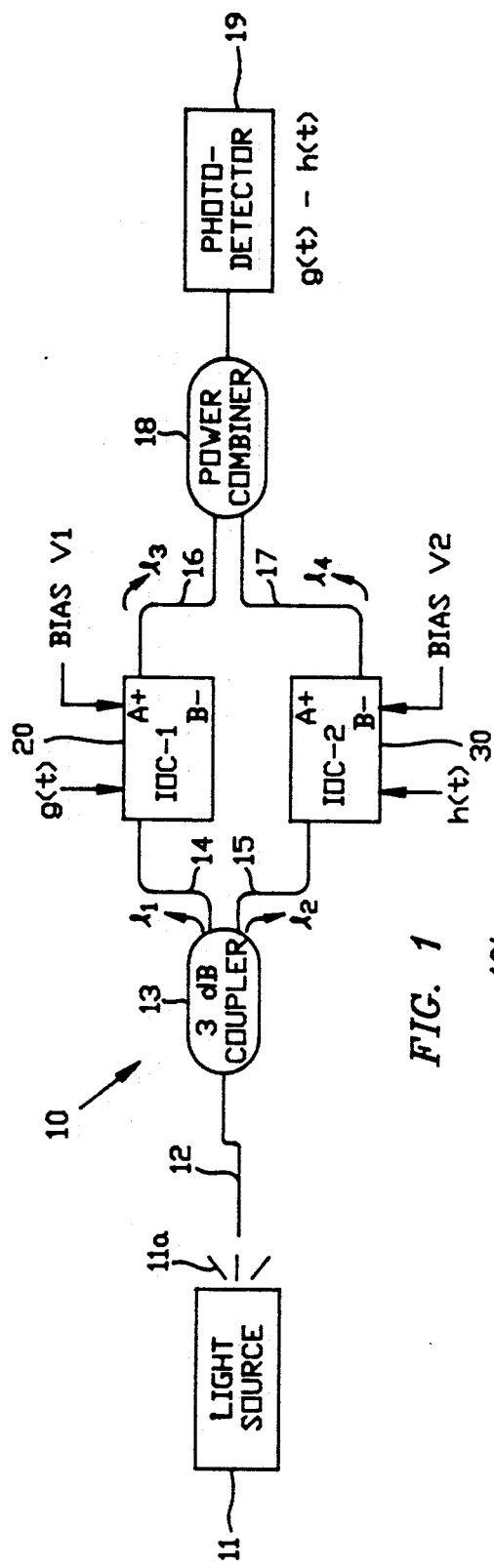
FIG. 1 is a schematic of the optoelectronic differential amplifier of this inventive concept.

Referring now to FIG. 1 of the drawings, an optoelectronic differential amplifier 10 has been fabricated which assured the wide bandwidth optical processing of a pair of input RF signals, g(t) and h(t). A cw laser diode 11 (or any other laser that has a coherence length >2 mm. to work in the integrated optical couplers to be described) emits light 11a at about 1.3 μm (or other appropriate wavelengths) which is conveyed by a single mode fiber 12 to a 3 dB coupler 13. Light $l_1$ and $l_2$ exits the 3 dB coupler over a pair of single mode fibers 14 and 15 to two integrated optical modulators or integrated optical couplers IOCs 20 and 30. Optionally, the 3 dB coupler could be dispensed with if the fibers were suitably optically coupled to the light source to deliver appropriate signals to the IOCs. Optical outputs $l_3$ and $l_4$ are fed from the two IOCs via single mode fibers 16 and 17, combined in a power combiner 18 to an InGaAs (or appropriate) photodetector 19. The power combiner may be no more than a pair of single mode fibers, each transmitting an output $l_3$ or $l_4$ which are fused to a multimode fiber that incoherently sums these signals and feeds them to the photodetector. Optionally, the single mode fiber could be connected to a single mode 3 dB coupler, the output of which could be optically coupled to a multimode fiber that extends to the photodetector. Another possibility would be that the fiber could be appropriately separated from the photodetector to achieve incoherent summing. Other incoherent coupling arrangements will suggest themselves to one skilled in the art.

IOCs 20 and 30 are the most critical components of the optoelectronic differential amplifier, and for this application the IOCs were used as modulators. The IOCs used in an embodiment of the optoelectronic differential amplifier were 3 GHz bandwidth Mach-Zehnder interferometers. The IOCs may be such as those depicted in the Ericsson Components AB Fiber Optics Product brochure for the High-speed LiNbO₃ External Modulators, PGM 1010/3MP, PGM 1010/5MP, PGM 2010/3MP, and PGM 2010/5MP and suitably arranged in accordance with the designation "Principle layout of high-speed Mach-Zehnder modulator". Although the 3 GHz bandwidth Mach-Zehnder interferometer configuration was selected, IOCs with signal bandwidths up to 18 GHz are commercially available to suitably function in accordance with the design parameters of a particular application, see, for example, the 18 GHz integrated optical amplitude modulators for the Mach-Zehnder architecture, Y-35-8808-01, by GEC Advanced Optical Products of West Hanningfield Road, Great Baddow, Chelmsford, Essex, England CM2 8HN for their and the Integrated Optical Modulators model Y-35-8808-01 of Hoechst Celanese Advanced Photonios, 86 Morris Avenue, Summit, N.J. 07901 USA. The intensity modulation from the selected IOCs had a cosine squared response to the electronic input signals, but most other types of intensity optical modulators also can be selected with satisfactory operational effects.

The RF electrical signals of interest g(t) and h(t) were applied to IOC 20 and IOC 30, respectively. The IOCs were biased with bias voltage V1 and V2 to the linear portion of their response curves. Bias voltage V1 is coupled to IOC 20 and has the proper magnitude to assure the operation of this IOC on the positive going slope of its response curve to provide an output at an output port A+ and bias voltage V2 is coupled to IOC 30 and has the proper magnitude to assure the operation of this IOC on the negative going slope of its response curve to provide an output at an output port B−. In this inventive concept the IOCs are interconnected to provide useful output signals at output port A+ in IOC 20 and an output port B− in IOC 30.

The modulated optical intensities out of a port A+ of both these IOCs 20 and 30 is in phase with respect to the RF input signal, g(t) or h(g), and the intensity of an output port B− of both these IOCs 20 and 30 is 180° out-of-phase with respect to the RF inputs g(t) or h(t). Thus, the output ports of each IOC 20 or 30 were selected so that the intensity modulation corresponding to the input RF signal g(t) in IOC 20 was in-phase with respect to its respective RF input g(t), that is, IOC 20 is operating on the positive going slope of its response curve, and the intensity modulation in IOC 30 from RF input, h(t) was out-of-phase with respect to its respective RF input h(t), that is, IOC 30 is operating on the negative going slope of its response curve.

The summation, algebraic summation, of the two signals with a 180° phase shift was equivalent to subtracting h(t) from g(t) and was performed optically in power combiner 18 and converted to an electrical signal in photodetector 19. Associated components, not shown, which are compatible with this inventive concept provide for further processing in accordance with a desired application as will be readily apparent to those skilled in the art to which this invention pertains.

Differential amplifier operation requires that the two electrical signals be subtracted coherently at the electronic signal frequency. In order for this to occur, it is essential that the two intensity modulated signals be summed incoherently at the optical carrier frequency while maintaining coherence at the electronic signal frequency. By summing the optical signals incoherently, optical interference effects have been eliminated. The signals are summed incoherently in this inventive concept by introducing a path difference longer than the laser coherence length $l_c$ into the system. This creates the condition $$|l_1 - l_2| >> l_c \qquad (1)$$

The length of the fibers out of the two IOCs 20 and 30 are $l_3$ and $l_4$, respectively, and must be equal for the signals to be subtracted simultaneously. The tolerance on $l_3$ and $l_4$ depends on the highest frequency component in the electrical signal, $f_h$ (in either of the electrical signals of interest g(t) and h(t)), so that the condition exists:

$$|l_3 - l_4| << \frac{c}{f_H} \qquad (2)$$

Although this approach ensures that the optical signals are summed incoherently, it is apparent to those skilled in the art to which this invention pertains that other approaches could be used, for example and as elaborated on below, two different laser sources having different emissions could be used to assure that the coherence length is exceeded, one injecting light into IOC 20 and the other injecting light into IOC 30.

The optoelectronic differential amplifier has the signal properties of two analog optical communications links combined at detector 19. The common mode rejection ratio (CMRR) can approach the dynamic range of the system. In a representative embodiment of this inventive concept optoelectronic differential amplifier 10 had (in a 1-Hz bandwidth) a linear dynamic range of 134 dB, a minimum detectable signal of −157 dBm, spurious free dynamic range of 98 dB/Hz⅔, and third order intercept of −11 dBm. By an appropriate selection of components freely available within the state of the art these figures can be tailored (improved) to accommodate a particular application.

The differential amplifier gain/loss depends on the loss and gain in the system. Optical losses, for the most part, are due to optical device insertion and coupling losses. Gain or loss depends on the V$\pi$ of the particular IOC selected: the smaller the V$\pi$, the larger the gain. However, gain can be increased by increasing the intensity of the laser or by introducing optical amplifiers. In a representative embodiment of this concept the IOC insertion loss was approximately 6 dB, V$\pi$ approximately 8 V, and the optical power from the laser diode was 70 mW. The RF drive power was +5 dBm. The minimum drive power is limited by the noise in the bandwidth of interest. The net gain of the representative of the embodiment was approximately −35 dB. RF gains as high as +11 dB have been reported for related systems, see the article by G. E. Betts et al. entitled "High-Performance Optical Analog Link Using External Modulator", *IEEE Photon. Technol. Lett.*, Vol. 1, pp. 404–406 (1989). The RF input to output gain could be higher with the use of optical amplifiers.

Figure 3:
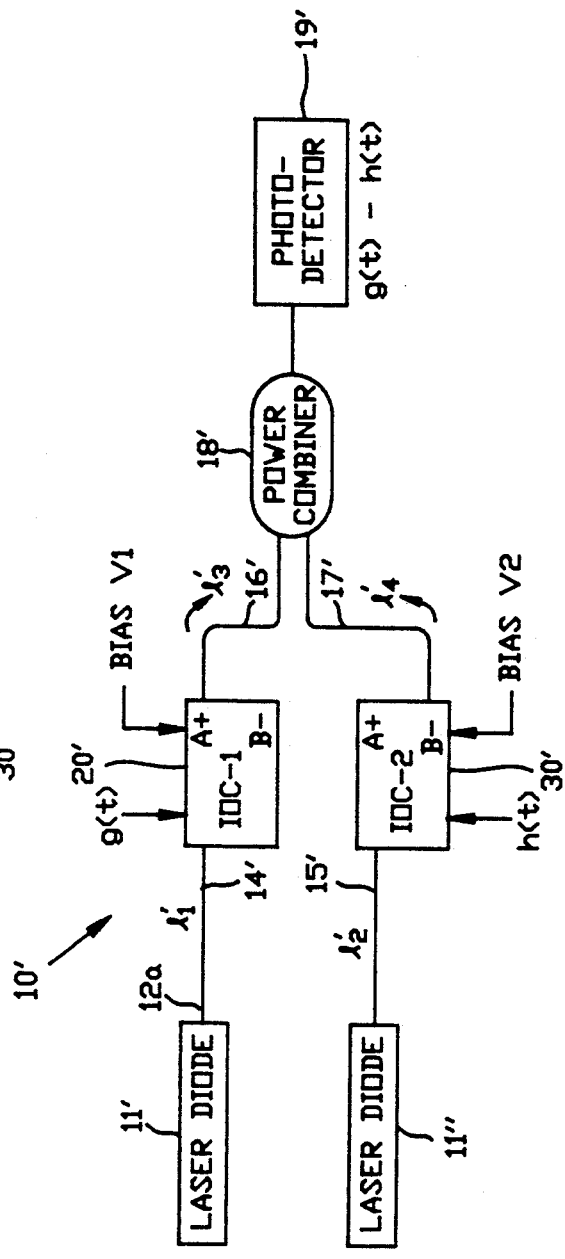
FIG. 3 shows a modification of the optoelectronic differential amplifier.

Since the loss/gain of the two optical paths (paths including l$_1$-IOC 20-l$_3$ as opposed to l$_2$-IOC 30l$_4$) may differ, it is advantageous to use a two-laser approach so that the intensity incident on the detector from each path can be equalized. FIG. 3 shows a pair of laser diodes 11' and 11" each interconnected to a separate IOC 20' and 30' by lengths l'$_1$ 14' and l'$_2$ 15' which are predetermined to have lengths which have differences in excess of the coherence lengths of the lasers involved. Selection of components and adjustments may be made to accommodate this embodiment to assure more acceptable results for certain signal processing applications. Optionally, a pair of light sources are coupled optically to only a separate one of said first IOC or said second IOC without any optical waveguide. However, when this approach is relied upon, care must be taken that the frequency separation of both light sources exceeded the highest frequency component in the electrical signal (f$_{laser\ 1}$ -f$_{laser\ 2}$ >F$_H$).

The transfer function of the IOCs 20' and 30' does not vary significantly from device to device because it is a physical characteristic of the modulator, unaffected by manufacturing conditions. Therefore, it is possible to make the common mode rejection ratio of the differential amplifier approach the dynamic range of the system by equalizing the gain of the two paths. The common mode distinction for very wide bandwidth signals will be left because the IOC frequency response over the multi-gigahertz bandwidth is device dependent.

Figure 2:
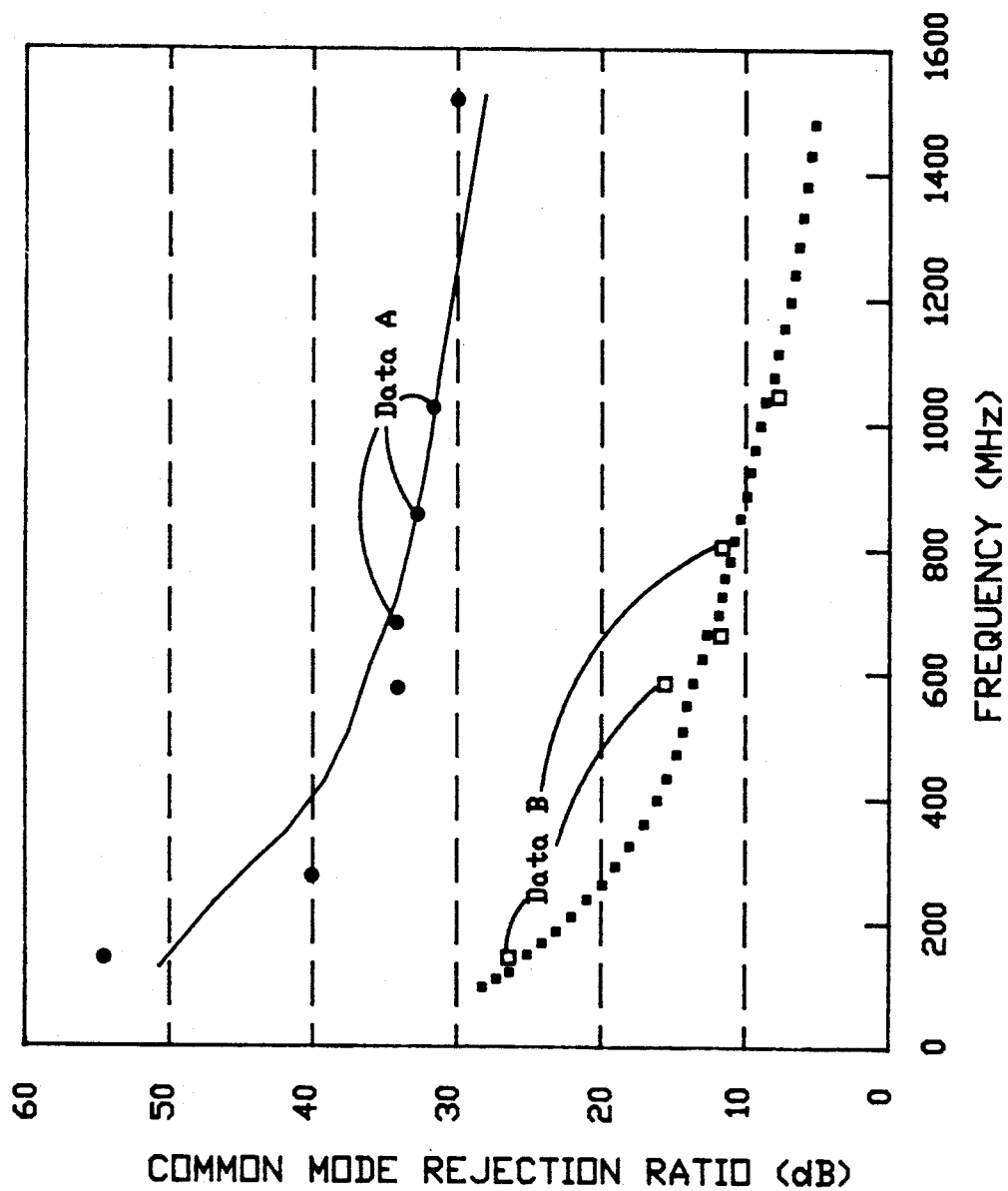
FIG. 2 depicts a common mode rejection ratio measured for two different time differences between the two input paths with Data A designated by dots and theoretical performance by a straight line, theory ($\tau = 58$ ps) and Data B being represented by squares and theoretical performance by a dotted line of smaller squares, theory ($\tau = 4$ ps).

The parameter CMRR was defined as the ratio of electrical power out of the differential amplifier for the case where an input signal g(t) was applied and h(t) equals zero, to the case where the input signals g(t) and h(t), were equal. The CMRR was measured at several frequencies from 100 MHz to 15 GHz. The results are shown in FIG. 2 for the embodiment of FIG. 1. The CMRR depended strongly on the difference between the two signal path links. The relationship between a CMRR, the measurement frequency, f, and the time difference between the two paths, $\tau$, is given by $$\text{CMRR} < -20 \log[\sin(\pi f \tau)] \qquad (3)$$

Data A is shown with a theoretical curve for $\tau = 58$ ps. An effort was made to reduce the time discrepancy. The data of B is shown with the theoretical curve for $\tau = 4$ ps. This data shows CMRR being greater than 30 dB at 1 GHz. According to this theory, common mode rejection ratios greater than 50 dB could be obtained for 1-GHz signal bandwidth if the path differences are less than 0.5 ps. This can be done easily by putting the two IOCs together in an integrated optical differential amplifier module. For very small path differences, the CMRR is limited by the spurious free dynamic rang of the differential amplifier. A largest CMRR obtained at 1 GHz with the disclosed system would be 70 dB. This is for −10 dBm input signals and the output path length difference is less than 50 femtoseconds.

The new optoelectronic wideband differential amplifier fabricated in accordance with this inventive concept performs signal subtraction in the optical regime as opposed to contemporary optoelectronic systems. The design of this inventive concept does not require careful matching and tuning as in electronic wideband differential amplifiers or balanced circuit configurations. The optoelectronic wideband differential amplifier of this inventive concept advantageously employs recent developments in low noise, large dynamic range, analog fiber optic communication systems. Judicious selections of components well within the purview of one skilled in the art to which this invention pertains assures improved differential amplifier performance. The optoelectronic wideband differential amplifier of this inventive concept is useful as a component in radar and communication systems or other uses where high frequency RF signals are to be processed.

Obviously, many other modifications and variations of the present invention are possible in light of the above teachings. It is to be understood therefore that within the scope of the appended claims the invention may be practiced otherwise than as specifically described.

We claim:

1. An optoelectronic wideband differential amplifier for a pair of RF signals g(t) and h(t) comprising: means for emitting optical radiation having a coherence length lc;

a first optical waveguide having a first length connected to receive a first portion of the emitted optical radiation;

a second optical waveguide having a second length coupled to receive a second portion of the emitted optical radiation, the difference in length between said first length and said second length of the first waveguide and second waveguide being greater than the said coherence length lc;

a first IOC optically coupled to said first waveguide to receive said first portion of said emitted optical radiation and electrically coupled to receive the RF signal g(t), said first IOC is suitable adapted for operation on the positive going slope of its response curve to provide an output A+;

a second IOC optically coupled to said second waveguide to receive said second portion of said emitted optical radiation and electrically coupled to receive the RF signal h(t), said second IOC is suitably adapted for operation on the negative going slope of its response curve to provide an output B−;

a power combiner optically coupled to receive said output A+ and said output B− for summing said output A+ and said output B−, said summing being performed incoherently with respect to the optical signals and said summing being performed coherently with respect to the electrical signals therein;

a first output optical waveguide coupled to the A+ output of said first IOC and said power combiner;

a second optical output waveguide coupled to the output B− of said second IOC and said power combiner, said first output waveguide and said second output waveguide being the same length; and a first bias voltage coupled to said first IOC having the proper magnitude to assure said operation on the positive going slope of its response curve to provide said output A+ and a second bias voltage coupled to said second IOC having the proper magnitude to assure said operation on the negative going slope of its response curve to provide said output B−; and means coupled to said power combiner for converting to an electrical signal representative for the instantaneous difference in amplitude of said pair of RF signal g(t) and h(t).

2. An apparatus according to claim 1 further including:

means optically coupled to said optical radiation emitting means to receive the emitted optical radiation therefrom for splitting it between said first portion and said second portion.

3. An apparatus according to claim 2 in which the splitting means is a 3 dB coupler.

4. An apparatus according to claim 3 in which said optical radiation emitting means is a single light source.

5. An apparatus according to claim 1 in which said optical radiation emitting means is a pair of light sources each optically coupled to only a separate one of said first IOC or said second IOC, each light source emitting optical radiation having a separate coherence length and separated in frequency, one from the other, by a difference much greater than the highest electrical signal frequency.

6. An apparatus according to claim 1 in which said optical radiation emitting means is a pair of light sources, one light source optically coupled to said first optical waveguide and the other coupled to said second optical waveguide.

7. A method of indicating the instantaneous difference in amplitude of a pair of RF signals g(t) and h(t) in an optoelectronic wideband differential amplifier comprising:

emitting optical radiation having a coherence length lc; connecting a first optical waveguide having a first length to receive a first portion of the emitted optical radiation;

connecting a second optical waveguide having a second length to receive a second portion of the emitted optical radiation, the difference in length between said first length and said second length of the first waveguide and second waveguide being greater than said coherence length lc;

providing a first IOC suitably adapted for operation on the positive going slope of its response curve to provide an output A+, said first IOC is optically coupled to said first waveguide to receive said first portion of said emitted optical radiation and is electrically coupled to receive the RF signal g(t);

providing a second IOC suitably adapted for operation on the negative going slope of its response curve to provide an output B−, said second IOC is optically coupled to said second waveguide to receive said second portion of said emitted optical radiation and is electrically coupled to receive the Rf signal h(t);

summing said output A+ and said output B− in power combiner, said summing being performed incoherently with respect to the optical signals and said summing being performed coherently with respect to the electrical signals therein;

coupling a first output optical waveguide to the A+ output of said first IOC and said power combiner;

coupling a second optical output waveguide to the output B− of said second IOC and said power combiner, said first output waveguide and said second output waveguide being the same length; and biasing said first IOC with a first bias voltage having the proper magnitude to assure said operation on the positive going slope of this response curve to provide said output A+ and biasing said second IOC with a second bias voltage having the proper magnitude said to assure said operation on the negative going slope of its response curve to provide said output B−; and providing a means of converting the optical sum to an electrical signal representative of the instantaneous difference in amplitude of said pair of RF signals g(t) and h(t).

8. A method according to claim 7 further including:

splitting the emitted optical radiation between said first optical waveguide and said second optical waveguide with a 3 dB coupler.

9. A method according to claim 8 in which said emitting is by a single light source.

10. A method according to claim 7 in which said emitting is by a pair of light sources each optically coupled to only a separate one of said first IOC or said second IOC, each light source emitting optical radiation having a separate coherence length and separated in frequency, one from the other, by a difference much greater than the highest signal frequency.

11. A method according to claim 7 in which said emitting is by a pair of light sources each optically coupled to only a separate one of said first IOC or said second IOC by either said first optical waveguide or said optical waveguide.

* * * * *